Jan. 20, 1931. P. J. KNAUS 1,789,469
ARTICLE FORMING APPARATUS
Filed Oct. 30, 1926  2 Sheets-Sheet 1

Inventor
Peter J. Knaus
by [signature] Att'y.

Jan. 20, 1931. P. J. KNAUS 1,789,469
ARTICLE FORMING APPARATUS
Filed Oct. 30, 1926   2 Sheets-Sheet 2
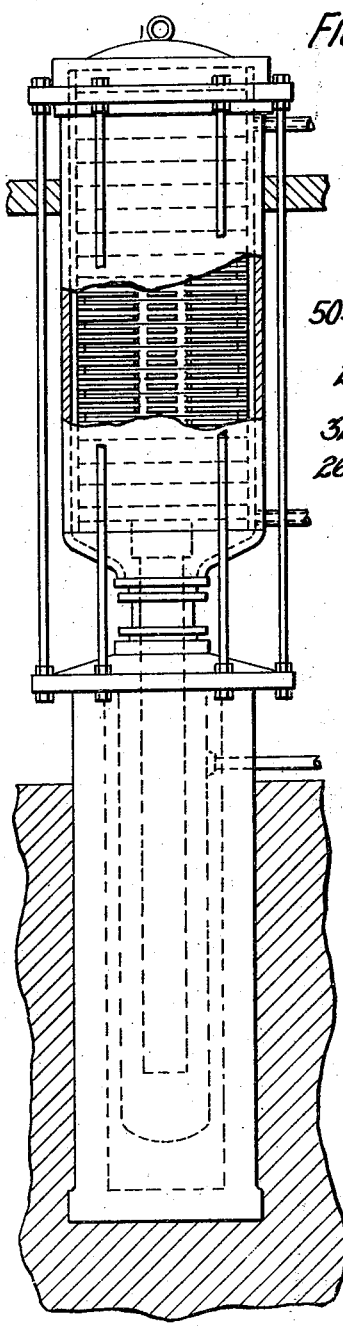
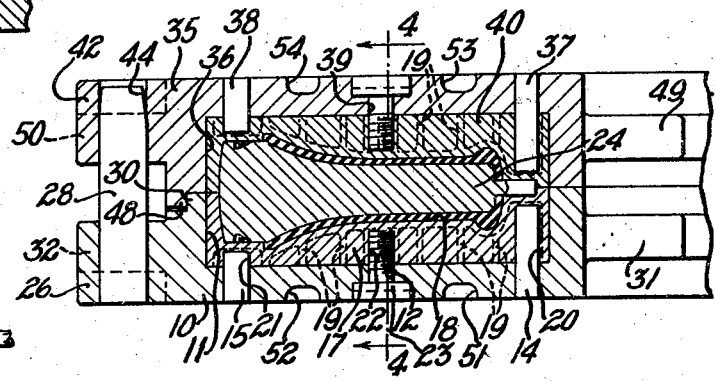
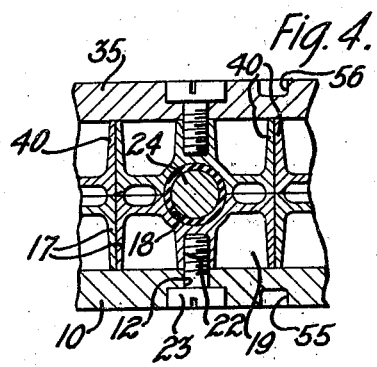
Inventor
Peter J. Knaus
by *Hu Patterson* Att'y Patented Jan. 20, 1931

1,789,469

UNITED STATES PATENT OFFICE

PETER JOHN KNAUS, OF CHICAGO, ILLINOIS, ASSIGNOR TO WESTERN ELECTRIC COMPANY INCORPORATED, OF NEW YORK, N. Y., A CORPORATION OF NEW YORK

ARTICLE-FORMING APPARATUS

Application filed October 30, 1926. Serial No. 145,115.

This invention relates generally to article forming apparatus, and more particularly to apparatus for forming telephone receiver shells.

The object of the invention is to provide an apparatus with interchangeable parts for accurately forming articles from plastic materials with a minimum expenditure of time and energy.

In accordance with the general features of the invention, there is provided in one embodiment thereof a pair of oppositely disposed frame members, in the outer surfaces of which a plurality of fluid-conducting grooves are formed, and which are provided with means for accurately aligning the members with respect to each other. Each of the frame members is provided with means for securing a plurality of interchangeable mold sections thereon and for accurately locating the sections on the frame member in such a manner that when the frame members with the mold sections attached are aligned in operative position, the mold sections on the opposite frame members coact to form complete molds. In making hollow articles suitable cores are placed within the mold sections before the frame members are placed in operative position.

Other objects and features of the invention will become apparent from the following detailed description taken in connection with the accompanying drawings illustrating one embodiment of the invention, and in which Fig. 1 is a plan view, partly broken away, of a forming apparatus embodying the invention;

Fig. 3 is an enlarged sectional view taken substantially on line 3—3 of Fig. 1;

Fig. 4 is an enlarged fragmentary sectional view taken substantially on line 4—4 of Fig. 3; and Fig. 5 is an elevational view, partly broken away, of a vulcanizing press used in connection with the article forming apparatus.

Figure 1:
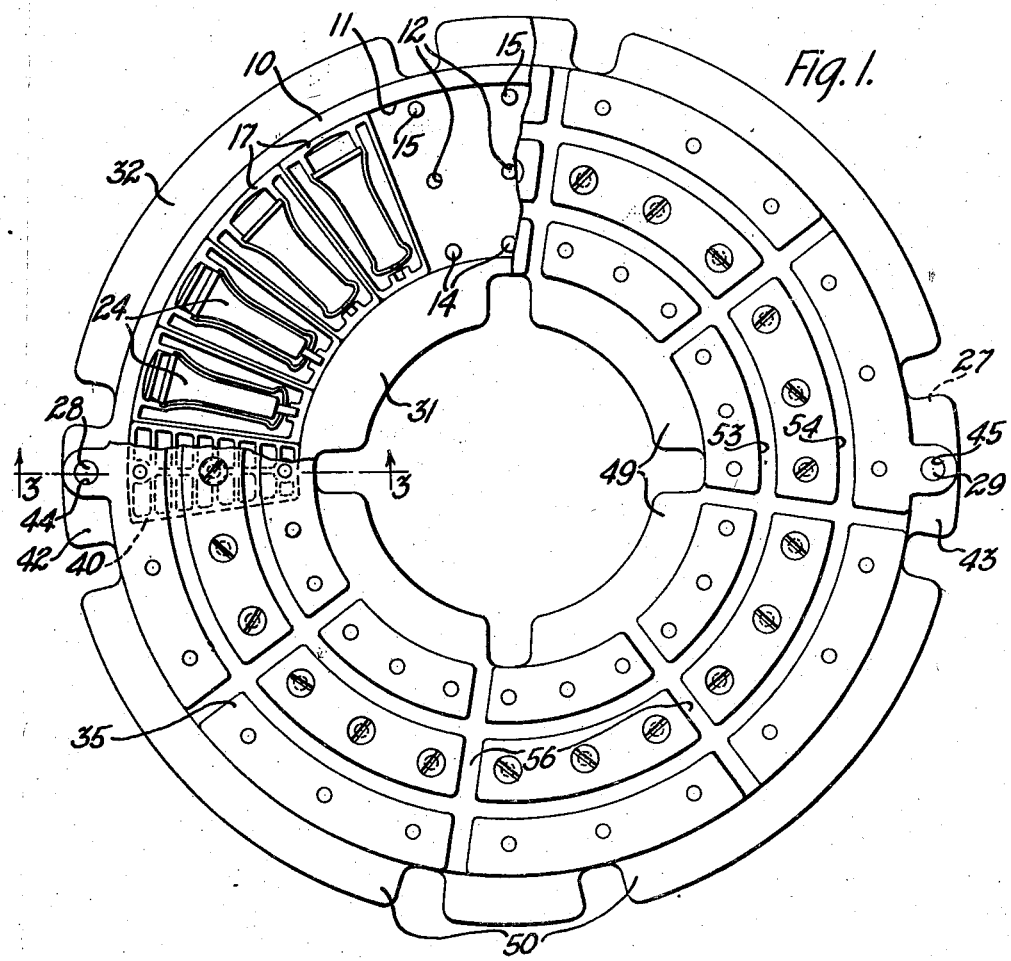
Figure 2:
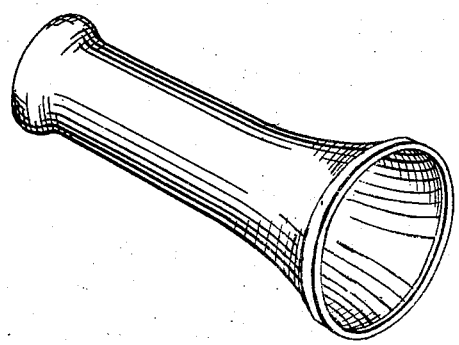
Fig. 2 is an enlarged perspective view of an article formed in the above apparatus.

The accompanying drawings, in which like numerals designate similar members throughout the several views, illustrate one embodiment of the invention which is designed to form hollow articles, such as telephone receiver shells, from a plastic, vulcanizable material. In the drawings, the numeral 10 (Figs. 1 and 3) designates an annular frame member which is provided on its upper side with an annular recess 11 in which is provided a circular series of openings 12—12 midway between the edges of the recess and concentric therewith. Near each edge of the recess 11 and on radial lines passing through the openings 12—12 are mounted a plurality of vertically extending dowel pins 14—14 and 15—15. Fitted within the recess 11 are a plurality of removable and interchangeable mold sections 17—17 which are provided at their upper sides with mold cavities 18—18 having contours corresponding to the outer surface of one-half of an article which is to be produced in the apparatus. The lower sides of the mold sections 17—17 are provided with a plurality of reinforcing ribs 19—19 and dowel-receiving sockets 20—20 and 21—21 (Fig. 3) into which the dowel pins 14—14 and 15—15 protrude to position the mold sections in the desired relation with respect to the frame member 10. The under sides of the mold sections 17—17 are also provided with threaded recesses 22—22 into which bolts 23—23 which are passed through the openings 12—12 in the frame member 10 are screwed to secure the mold sections to the frame member. Inserted within the mold cavities 18—18 are a plurality of cores 24—24, the outer surfaces of which are the shape desired for the inner surfaces of the finished article, which cores fit snugly against the ends of the mold cavities but leave a space equal to the thickness of the finished article between the upper surfaces of the mold cavities and the cores in which space a plastic vulcanizable material may be inserted.

The frame member 10 is also provided on its outer circumference with oppositely disposed ears 26 and 27 in which are mounted large upstanding dowel pins 28 and 29. Positioned near the outer periphery of the frame member 10 is a step-like ring dowel portion 30, the purpose of which will be more fully explained hereinafter, while a plurality of flanges 31—31 and 32—32 are provided along the inner and outer edges of the annular frame member 10 to provide means for handling the member.

Disposed upon the frame member 10 is a similar oppositely facing annular frame member 35 which is also provided with an annular recess 36 directly opposite the recess 11, which recess is provided with dowel pins 37—37 and 38—38 and apertures 39—39 similar to those described for the frame member 10. Mounted within the recess 36 are a plurality of removable and interchangeable mold sections 40—40 which are of the same form and are interchangeable with the mold sections 17—17 hereinbefore described, and which are secured and positioned in the recess 36 in a similar manner.

The frame member 35 is also provided near its outer periphery with a step-like ring dowel portion 48 which is designed to cooperate with the ring dowel portion 30 on the lower frame member 10 to align the frame members and to prevent lateral displacement between them, while the frame member 35 is provided with diametrically opposite ears 42 and 43 which are provided with openings 44 and 45 into which the dowel pins 28 and 29 may protrude to further position the frame members 10 and 35 with respect to each other and to prevent rotational displacement between the two members. The frame member 35 is also provided with inner and outer flanges 49—49 and 50—50 to facilitate handling the member. Each of the frame members 10 and 35 is provided on its outer surface with a plurality of annular grooves 51, 52, 53 and 54 and a plurality of radially extending grooves 55—55 and 56—56 which intersect the circular grooves, the purpose of which will be explained below.

In constructing the device, the frame members 11 and 35 are first formed so that the ring dowel portions 30 and 40 and the pin dowel portions 28 and 45 and 29 and 46 coact to position the members against either lateral or rotational displacement. A plurality of equally spaced radial lines are then marked out upon the upper frame member and a plurality of holes are drilled through the two members. The holes in each of the frame members are consequently directly opposite like holes in the opposite frame member and in these holes are mounted the dowel pins 14—14, 15—15, 37—37 and 38—38.

Another series of holes are then drilled midway between the edges of the recesses 11 and 36 which are the holes 12—12 and 39—39 mentioned above. It will be readily seen that the mold sections positioned in each of the frame members 10 and 35 by the dowel pins will each be positioned directly opposite a similar mold section mounted in the other frame member so that the several sections coact to form complete molds when the ring dowel 30 and the large pin dowels 28 and 29 in the frame member 10 coact with the corresponding members in the frame member 35.

It is believed that the operation of the apparatus will be more clearly understood from the following description of the steps taken in the manufacture of a completed article. The frame member 10 is placed in a horizontal position upon a suitable supporting table and the mold sections 17—17 are inserted in the recess 11 so that the dowel pins 14—14 and 15—15 enter the sockets 20—20 and 21—21. The bolts 23—23 are then inserted through the holes 12—12 and screwed into the threaded recesses 22—22 to secure the mold sections tightly in position. A strip of plastic vulcanizable material is then placed in each of the mold cavities 18—18 and the cores 24—24 are placed within the cavities over the strips of material. The mold sections 40—40 are secured in the frame member 35 in a manner similar to that described for the mold sections 17—17 and strips of a plastic vulcanizable material are also placed therein. The frame member 35 with its attached filled mold sections is then inverted over the frame member 10 and placed in the position shown in Figs. 1, 3 and 4 of the drawings. A plurality of assembled frame members are then placed in a vulcanizing press, such as that shown in Fig. 5, in which the sections are first subjected to pressure to tightly clamp the mold sections together in operative position so that the several sections will coact to form complete molds, and the finished articles will exhibit no line of demarcation between the several sections. Steam is then admitted into the vulcanizing press which passes down through the central annular openings in the frame members, around the edges of the members, and through the channels formed by the grooves provided in the outer surfaces of the frame members. The mold sections are heated by the steam to a temperature sufficiently high to fuse the strips of plastic material into homogeneous articles and to vulcanize the material to a state sufficiently rigid so that the articles will maintain the shape formed by contour of the mold sections and the cores. When the articles are vulcanized to the desired degree, the supply of steam is shut off, the assembled frames removed from the press, and the upper frame members withdrawn from the lower members, whereupon the cores surrounded by the finished articles may be removed from the mold cavities. The interior of the mold cavities are then cleaned, if necessary, and filled with strips of plastic material, cores are inserted, and the above operation is repeated.

What is claimed is:

1. An article forming apparatus comprising oppositely disposed annular frame members provided with intersecting grooves therein through which a fluid may flow, a plurality of mold sections secured in circular series to each of the frame members, and ring and pin dowel means for accurately aligning the frame members so that the mold sections coact to form a circular series of complete molds.

2. An apparatus for forming hollow articles from vulcanizable materials, which comprises oppositely disposed annular frame members, each of which is provided with a plurality of intersecting grooves through which a fluid may flow, a plurality of mold sections provided with mold cavities secured in a circular series to each of the mold sections, a plurality of removable cores inserted within the cavities in the mold sections, and ring and pin dowel means for accurately aligning the frame members for causing the mold sections to coact to form complete molds.

3. An apparatus for forming hollow articles from vulcanizable materials, which comprises a pair of oppositely disposed annular frame members, each of which is provided with a plurality of intersecting grooves through which a hot vulcanizing medium may flow, a plurality of interchangeable mold sections provided on one side with a mold cavity and on the other side with a plurality of dowel-receiving sockets, a plurality of circularly disposed dowel pins carried by each of the frame members designed to cooperate with the sockets in the mold sections to accurately position the sections with respect to the frame members, means on each of the frame members for securing a plurality of the sections thereto, a plurality of removable cores inserted within the mold cavities, one of the frame members provided with dowel-receiving depressions and the other frame member provided with upstanding dowel means designed to engage with the depressions to accurately align the frame members and cause the mold sections to coact to form a circular series of complete molds.

4. In an article forming apparatus, an annular frame member, a plurality of mold sections secured thereto, dowel means to position the mold sections with respect to the frame member, a pair of ears disposed on opposite edges of the frame member, a dowel pin secured in each of the ears, a ring dowel portion formed near the outer periphery of the frame member, a second annular frame member, a plurality of mold sections secured thereto, means to position the mold sections with respect to the second frame member, a pair of ears upon opposite sides of the second frame member provided with openings for the insertion of the dowel pins on the first mentioned frame member, and a ring dowel on the second frame member designed to cooperate with the ring dowel on the first member, the ring and pin dowels coacting to position the mold sections on the frame members so as to form complete molds.

5. In an article forming apparatus, an annular frame member provided on one side with a plurality of circular grooves and a plurality of radial grooves intersecting the circular grooves and provided on the other side with an annular recess medially of which are provided a circular series of openings concentric therewith, a plurality of dowel pins spaced in circular rows within and concentric with the recess, a plurality of removable and interchangeable mold sections, each of which is provided on one side with mold cavities and on the other side with a threaded recess, and a plurality of dowel-receiving depressions designed to cooperate with the dowel pins to position the mold sections with respect to the frame member, a plurality of threaded securing members inserted through the openings in the recess of the frame member and threaded into the recesses in the mold sections to secure the latter in position, a pair of oppositely disposed ears on the outer circumference of the frame member, a dowel pin secured in each of the ears, a ring dowel portion formed near the outer periphery of the frame member, a second annular frame member provided with openings for the opposed dowel pins in the first mentioned frame member, a plurality of mold sections secured to the second mentioned frame member, and a ring dowel on the latter member designed to cooperate with the ring dowel on the first member, the ring and pin dowels on the frame members coacting to position the mold sections to form complete molds.

In witness whereof, I hereunto subscribe my name this 22nd day of October A. D., 1926.

PETER JOHN KNAUS.